US012394553B2

(12) United States Patent
Aguirre

(10) Patent No.: US 12,394,553 B2
(45) Date of Patent: *Aug. 19, 2025

(54) TRANSFORMER TANK FOR A SHELL TYPE TRANSFORMER, SHELL TYPE TRANSFORMER AND METHOD FOR CLAMPING A MAGNETIC CORE OF A SHELL TYPE TRANSFORMER

(71) Applicant: Hitachi Energy Ltd, Zürich (CH)

(72) Inventor: Miguel Aguirre, Córdova (ES)

(73) Assignee: Hitachi Energy Ltd, Zürich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,854

(22) Filed: Mar. 18, 2024

(65) Prior Publication Data

US 2024/0221991 A1 Jul. 4, 2024

Related U.S. Application Data

(63) Continuation of application No. 18/283,306, filed as application No. PCT/EP2022/053122 on Feb. 9, 2022.

(30) Foreign Application Priority Data

Mar. 22, 2021 (EP) .................................... 21382225

(51) Int. Cl.
*H01F 27/26* (2006.01)
*H01F 27/02* (2006.01)

(52) U.S. Cl.
CPC ........... *H01F 27/266* (2013.01); *H01F 27/02* (2013.01)

(58) Field of Classification Search
CPC ............................... H01F 27/266; H01F 27/02
See application file for complete search history.

(56) References Cited

U.S. PATENT DOCUMENTS 1,539,878 A * 6/1925 Skinner ................. H01F 27/303 336/197
3,082,391 A * 3/1963 Chiki .................... H01F 27/245 336/59

(Continued)

OTHER PUBLICATIONS

International Search Report and Written Opinion of the International Searching Authority, PCT/EP2022/053122, mailed May 6, 2022, 15 pages.

(Continued)

*Primary Examiner* — Malcolm Barnes
(74) *Attorney, Agent, or Firm* — Sage Patent Group

(57) ABSTRACT

A clamping arrangement for exerting a clamping force on a magnetic core of a shell type transformer includes a plunger sleeve arranged inside a beam in the transformer and a plunger including a first end that is movable along a longitudinal axis to exert the clamping force, with a value of the clamping force being adjustable based on a position of the plunger with respect to the beam. The clamping arrangement further includes a screw device comprising a screw arranged at a first end of the plunger sleeve in contact with a second end of the plunger to move the plunger along its longitudinal axis. The screw is turnable in the thread of the plunger sleeve to move with respect to the plunger sleeve along the longitudinal axis and to set a part of the screw that protrudes the sleeve interior.

11 Claims, 5 Drawing Sheets

(56) References Cited

U.S. PATENT DOCUMENTS

| | | | | |
|---|---|---|---|---|
| 3,234,492 | A * | 2/1966 | Cure | H01F 27/303 336/197 |
| 4,085,395 | A * | 4/1978 | Billerbeck | H01F 27/06 336/61 |
| 2017/0186524 | A1 | 6/2017 | Stefanutti et al. | |
| 2019/0198238 | A1* | 6/2019 | Adar | H01F 27/28 |

OTHER PUBLICATIONS

International Preliminary Report on Patentability, PCT/EP2022/053122, mailed Feb. 22, 2023, 9 pages.
Decision for Grant of Patent for Korean Patent Application No. 10-2023-7030357, mailed Jan. 26, 2024, 5 pages.

* cited by examiner

TRANSFORMER TANK FOR A SHELL TYPE TRANSFORMER, SHELL TYPE TRANSFORMER AND METHOD FOR CLAMPING A MAGNETIC CORE OF A SHELL TYPE TRANSFORMER

CROSS REFERENCE TO RELATED APPLICATIONS

This application is a continuation of U.S. application Ser. No. 18/283,306, filed Sep. 21, 2023, which claims priority from 35 U.S.C. § 371 national stage application of PCT International Application No. PCT/EP2022/053122 filed on Feb. 9, 2022, which in turn claims priority to European Patent Application No. 21382225.7, filed on Mar. 22, 2021, the disclosures and content of which are incorporated by reference herein in their entirety.

FIELD

The present disclosure relates to a transformer tank for a shell type transformer, shell type transformer and method for clamping a magnetic core of a shell type transformer.

BACKGROUND

There is a need for a transformer tank for a shell type transformer that is reliable and stable, a shell type transformer that is reliable and stable and a method for clamping a magnetic core of a shell type transformer, which allows precise setting of a clamping force.

Transformer tanks house elements of the transformer like one or more coils and one or more magnetic cores, also referred to as magnetic circuits.

SUMMARY

According to an embodiment, a transformer tank for a shell type transformer is disclosed. The transformer tank comprises:

- a wall, the wall surrounding a tank interior,
- a clamping arrangement for exerting a clamping force on a magnetic core of the shell type transformer, wherein the clamping arrangement comprises:

- a beam fixed on the wall,
- a plunger, the plunger comprising a first axial end configured to exert the clamping force on the magnetic core, wherein the plunger is movable with respect to the beam along its longitudinal axis and a value of the clamping force is settable depending on the position of the plunger relative to the beam.

The transformer tank is configured to house elements of a transformer, in particular a shell type transformer. For example, the transformer tank is configured to house the magnetic core as well as one or more coils. The beam, which is fixed on the wall of the transformer tank, is also referred to as short circuit beam. Along the longitudinal axis, a designated installation space for the magnetic core is arranged below the beam. The plunger is arranged and configured for exerting the clamping force between the beam and the magnetic core. The plunger is supported at a second axial end opposite the first axial end at the beam. The clamping force is controllable by controlling the position of the plunger with respect to the beam. Thus, a total force transferred to the magnetic core is settable to a desired value. For example, this allows a reliable clamping of the magnetic core, in particular a clamping of different parts of the magnetic core together. This allows a stable and reliable arrangement of the transformer tank as well as the transformer which comprises the transformer tank.

For example, the transformer tank, in particular the clamping arrangement, comprises a screw device. The screw device is in contact with the second axial end of the plunger. The screw device is configured for moving the plunger along its longitudinal axis. By screwing one or more screws of the screwing device the plunger is pushable in the direction towards the magnetic core. Thus, the clamping force can be set dependent on the screws of the screw device, in particular dependent on a torque exerted on the screws.

For example, the plunger is arranged in a plunger sleeve. The plunger sleeve and the plunger, for example, form a unit, in particular together with the screw device. This unit is installed at the beam on the wall of the transformer tank.

According to embodiments, the transformer tank, in particular the clamping arrangement, comprises a plurality of plungers. For example, the plungers are all similar in structure and function. For example, the plungers are different in structure and design.

According to further embodiments, the different plungers are designed differently. The plungers are configured to exert a preset value of the clamping force on the magnetic core. The preset value of the clamping force may be the same or different for the respective plungers.

According to an embodiment, a shell type transformer comprises a transformer tank according to at least one embodiment described herein. The shell type transformer comprises a magnetic core. The plunger exerts a preset value of the clamping force on the magnetic core. Thereby, the magnetic core is fixed in a stable and reliable manner in the transformer tank.

According to an embodiment, a method for clamping a magnetic core of a shell type transformer comprises: moving a plunger along its longitudinal axis with respect to a wall of a transformer tank. Thereby a clamping force is set on a magnetic core of the transformer. By moving the plunger along its longitudinal axis, a value of the clamping force is set to a desired and preset value. Thus, the magnetic core is clamped with a known value of the clamping force.

For example, the plunger is forced against the magnetic core using one or more screws. For example, a plurality of plungers is moved along their respective longitudinal axis to exert the clamping force on the magnetic core with their desired and preset value.

For example, the method for clamping a magnetic core is performed with the aid of a transformer tank for a shell type transformer described herein. Features and advantages described in connection with the transformer tank and the transformer also apply to the method and the other way around.

BRIEF DESCRIPTION OF THE DRAWINGS

The accompanying figures are included to provide further understanding. In the figures, elements of the same structure and/or functionality may be referenced by the same reference signs. It is to be understood that the embodiments shown in the figures are illustrative representations and are not necessarily drawn to scale.

DETAILED DESCRIPTION

While the disclosure is amenable to various modifications and alternative forms, specifics thereof have been shown by way of example in the figures and will be described in detail. It should be understood, however, that the intention is not to limit the disclosure to the particular embodiments described. On the contrary, the intention is to cover all modifications, equivalents, and alternatives falling within the scope of the disclosure defined by the appended claims.

Figure 1:
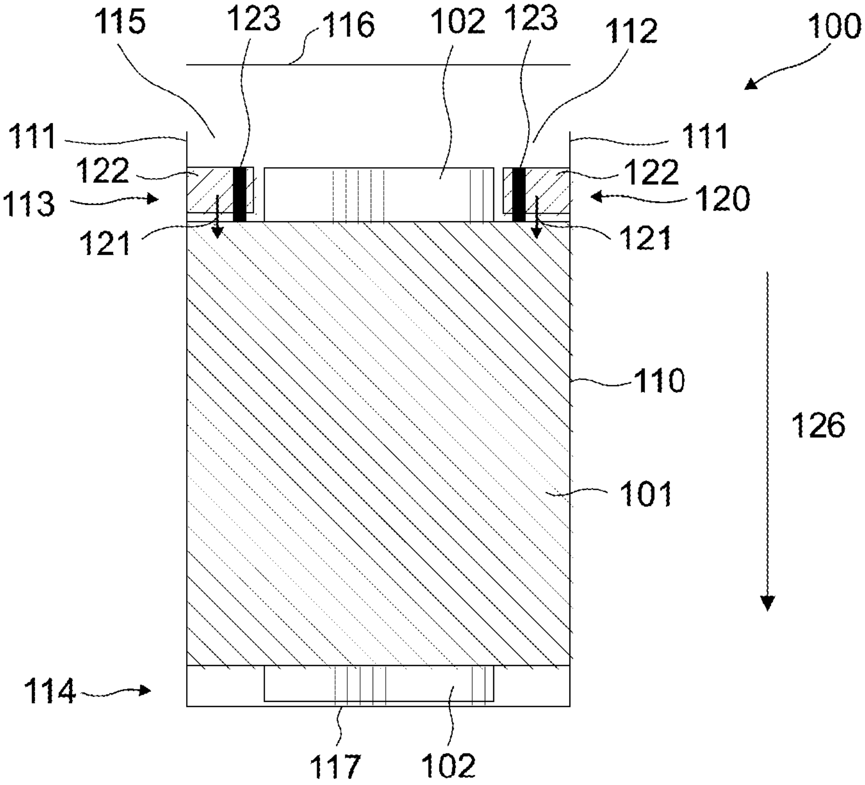
FIG. 1 is a schematic view of a transformer according to an embodiment.
Figure 2:
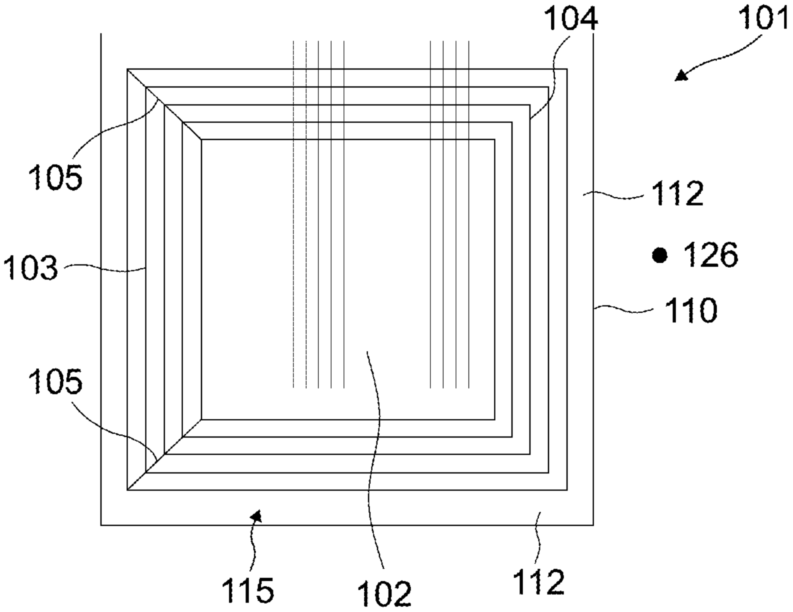
FIG. 2 is a schematic view of the transformer according to an embodiment.

FIG. 1 schematically shows a shell type transformer 100 according to an embodiment. FIG. 2 schematically shows parts of the shell type transformer 100 in a top view.

The shell type transformer 100 may be a one-phase transformer, or a three-phase transformer, for example. The shell type transformer 100 comprises a transformer tank 110. Walls 111 of the transformer tank 110 surround a tank interior 112. Inside the tank interior 112 a magnetic core 101 and one or more coils 102 are arranged. For example, the magnetic core comprises a plurality of magnetic core parts 103 and 104 (FIG. 2) that together form the magnetic core 101. The magnetic core parts 103, 104 are connected at joints 105. The coil 102 is surrounded by the magnetic core 101 at least in parts.

The transformer tank 110 comprises an upper tank part 113 and a lower tank part 114. The lower tank part 114, for example, is arranged below the upper tank part 113 along a long axis 126. The lower tank part 114 comprises a bottom 117, for example, for supporting the shell type transformer 100 at an underground location.

The upper tank part 113 comprises an upper opening 115. The upper opening 115 allows access to the tank interior 112. During use, the upper opening 115 for example is closed by a cover 116.

A clamping arrangement 120 is arranged on an inside of the wall 111 in the tank interior 112, in particular in the upper tank part 113. The clamping arrangement 120 comprises a beam 122 or a plurality of beams 122. The beam 122 is also called short circuit beam. The beam 122 is arranged at an upper side of the magnetic core 101. A part of the coil 102 is arranged between the beams 122. The beam 122 is arranged between the upper opening 115 or the cover 116 and the magnetic core 101 along the longitudinal axis 126.

The clamping arrangement 120 comprises a plunger 123 or a plurality of plungers 123. The plungers 123 are tense between the beam 122 and the magnetic core 101. The plungers 123 exert a force along the long axis 126 to the magnetic core 101. Thereby, the magnetic core 101 and in particular the magnetic core parts 103, 104 are tightly fixed in the transformer tank 110. A desired clamping force 121 acts on the magnetic core parts 103, 104. This leads to a connection force between the magnetic core parts 103, 104. The clamping arrangement 120 allows a precise setting of a value of the clamping force to a desired reset value. This leads to a stiff core with a high pressure at the joints 105. In particular, in the case of a short circuit this stiff and rigid core absorbs loads. Thus, a reliable and stable shell type transformer 100 is realized.

Figure 3:
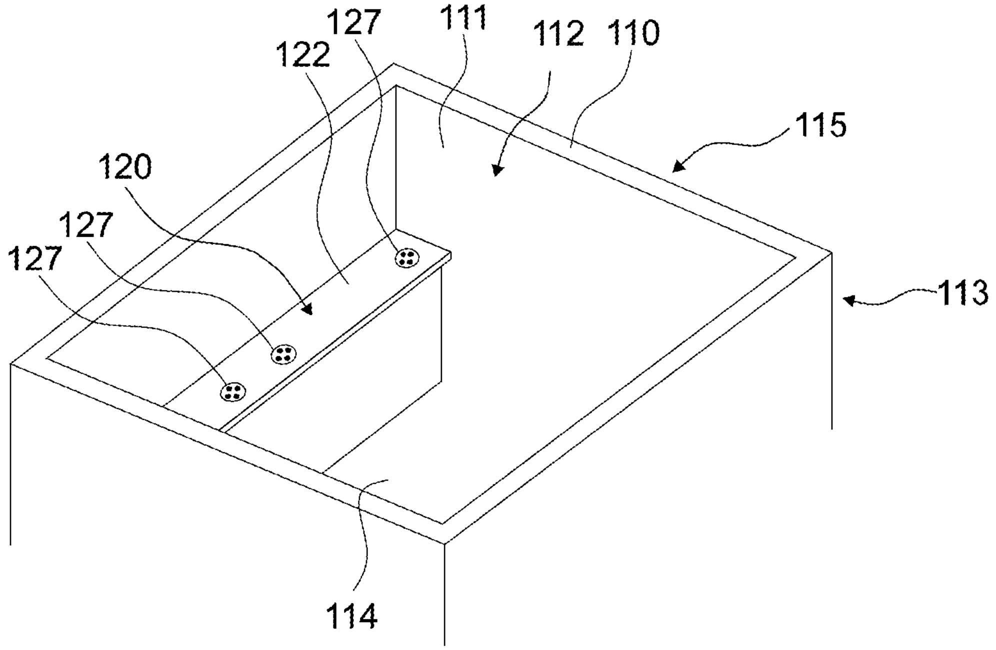
FIGS. 3 and 4 are schematic views of a transformer tank according to an embodiment.
Figure 4:
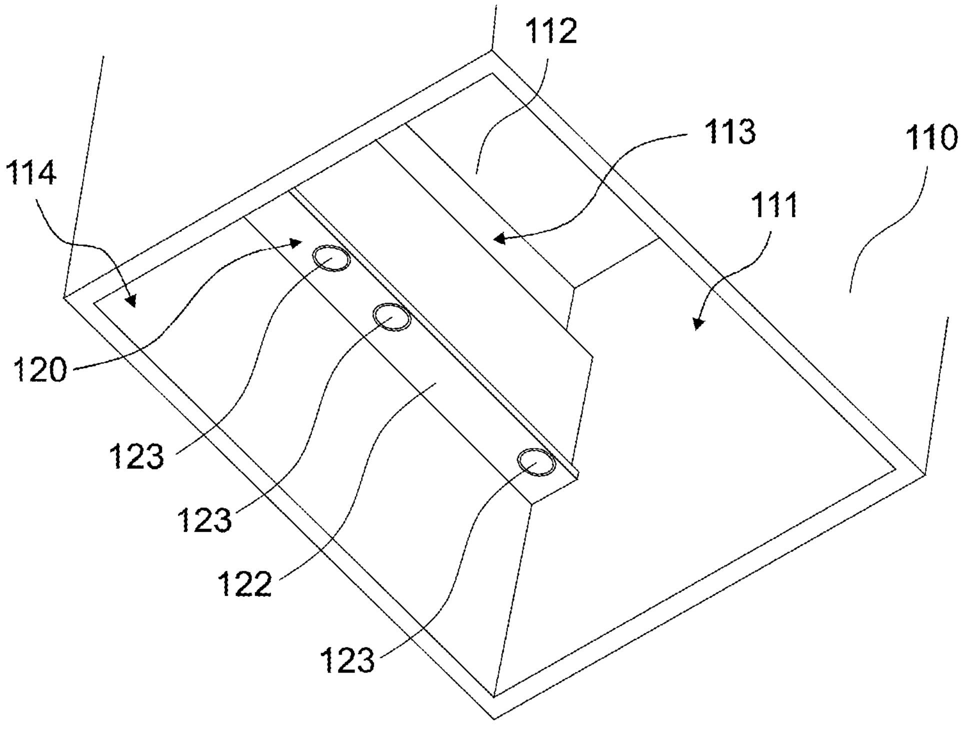
Figure 5:
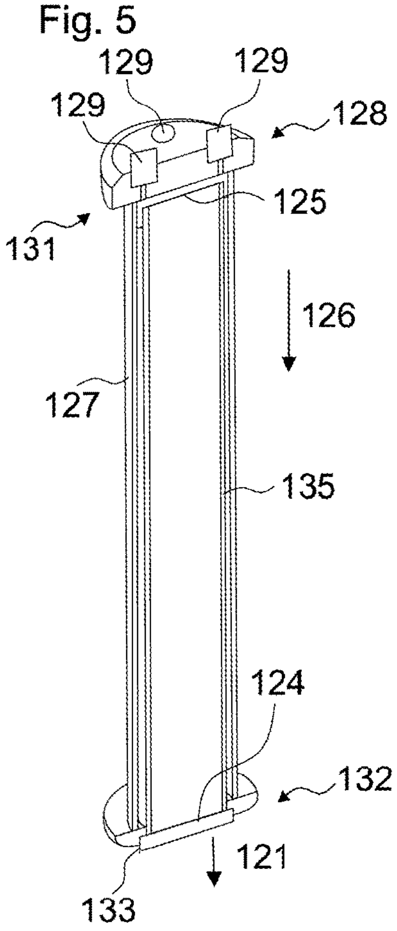
FIGS. 5 to 7 are schematic views of a plunger and a plunger sleeve according to embodiments.
Figure 6:
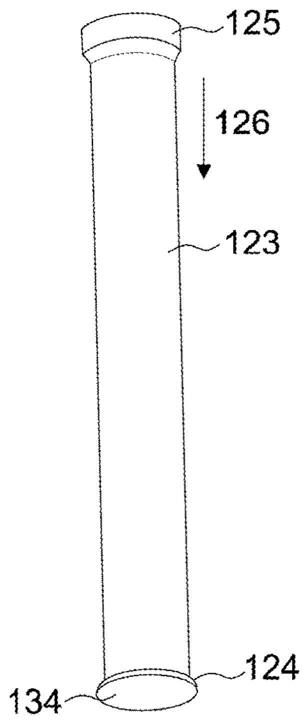
Figure 7:
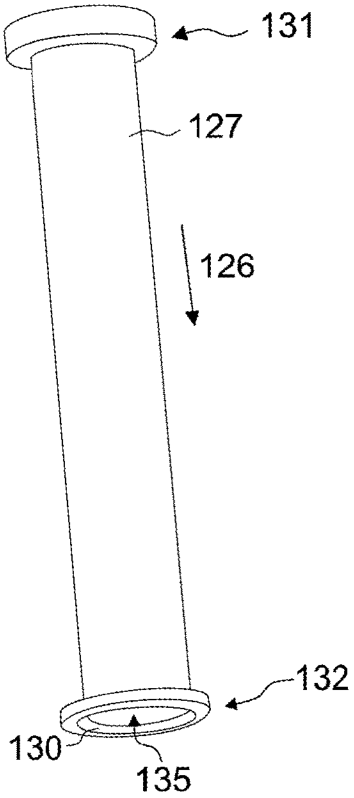

FIGS. 3 and 4 schematically show different views of the transformer tank 110 and FIGS. 5 to 7 schematically show the plunger 123 and the plunger sleeve 127.

FIG. 3 shows the upper tank part 113 with the upper opening 115. FIG. 4 shows a view on the lower tank part 114 from the bottom side.

The clamping arrangement 120 comprises the plungers 123 which are arranged in corresponding plunger sleeves 127. The plunger sleeves are each connected to the beam 122, for example by welding. The plungers 123 are movable, slidable, displaceable and adjustable along the longitudinal axis 126 relative to the corresponding plunger sleeves 127.

As for example shown in FIGS. 5 and 7, the plunger sleeve 127 is a hollow sleeve that surrounds a sleeve interior 135 (for example FIGS. 5 and 7). The sleeve interior 135 is delimited at a first axial end 131. During operation, the first axial end 131 of the plunger sleeve 127 faces the upper opening 115. The first axial end 131 of the plunger sleeve 127 is accessible through the upper opening 115.

A screw device 128 is arranged at the first axial end 131 of the plunger sleeve 127. The screw device 128 comprises one or more screws 129, for example four screws 129. The screws 129 are turnable in a thread of the plunger sleeve 127 to move with respect to the plunger sleeve 127 along the longitudinal axis 126. Thus, a part of the screw 129 that protrudes the sleeve interior 135 is settable. In particular, the length of the protruding part of the screw 129 is settable.

The plunger sleeve 127 comprises a second axial end 132 opposite the first axial end 131 along the longitudinal axis 126. The plunger sleeve 127 comprises an opening 130 at the second axial end 132 of the plunger sleeve 127. The opening 130 is configured such that the plunger 123 can reach through the opening 130 from the sleeve interior 135 to the outside of the plunger sleeve 127. A protrusion 133 of the plunger 123 protrudes and projects over the plunger sleeve 127 at the second axial end 132 of the plunger sleeve 127.

As for example shown in FIG. 6, the plunger 123 comprises a first axial end 124 and a second axial end 125. The second axial end 125 is opposite the first axial end 124 along the longitudinal axis 126. The plunger 123 comprises an elongated shape between the first axial end 124 and the second axial end 125 along the longitudinal axis 126.

The second axial end 125 of the plunger 123 is arranged at the first axial end 131 of the plunger sleeve 127. The second axial end 125 of the plunger 123 is in contact with the screw device 128, in particular in contact with the screws 129.

The first axial end 124 of the plunger 123 protrudes over the plunger sleeve 127 at the second axial end 132 of the plunger sleeve 127. A contact surface 134 is formed at the first axial end 124 of the plunger 123. The plunger 123 is in contact with the magnetic core 101 with the contact surface 134.

The screws 129 of the screw device 128 allow a precise positioning of the plunger 123 with respect to the plunger sleeve 127. The screws 129 set a displacement of the plunger 123 in direction towards the magnetic core 101 along the longitudinal axis 126. With the screws it is controllable how far the protrusion 133 protrudes over the plunger sleeve 127. The screws 129 push against the second axial end 125 of the plunger sleeve 129 such that the clamping force 121 is exertable by the first axial end 124.

According to the embodiment shown in FIGS. 3 and 4, the clamping arrangement 120 comprises four plungers 123 at two opposing inner sides of the tank 110. According to a further embodiment, the number of plungers 123 is different, for example, more than four or less than four plungers per side. The position of the plungers 123 with respect to the tank 110, for example, is set dependent on preferred locations where the clamping force 121 should act on the magnetic core 101. In particular, the respective positions of the plungers 123 are predetermined dependent on the locations of the joints 105 between the magnetic core parts 103, 104. The position of the plungers 123 is chosen such that a desired connection force is exerted on the joints 105.

Figure 8:
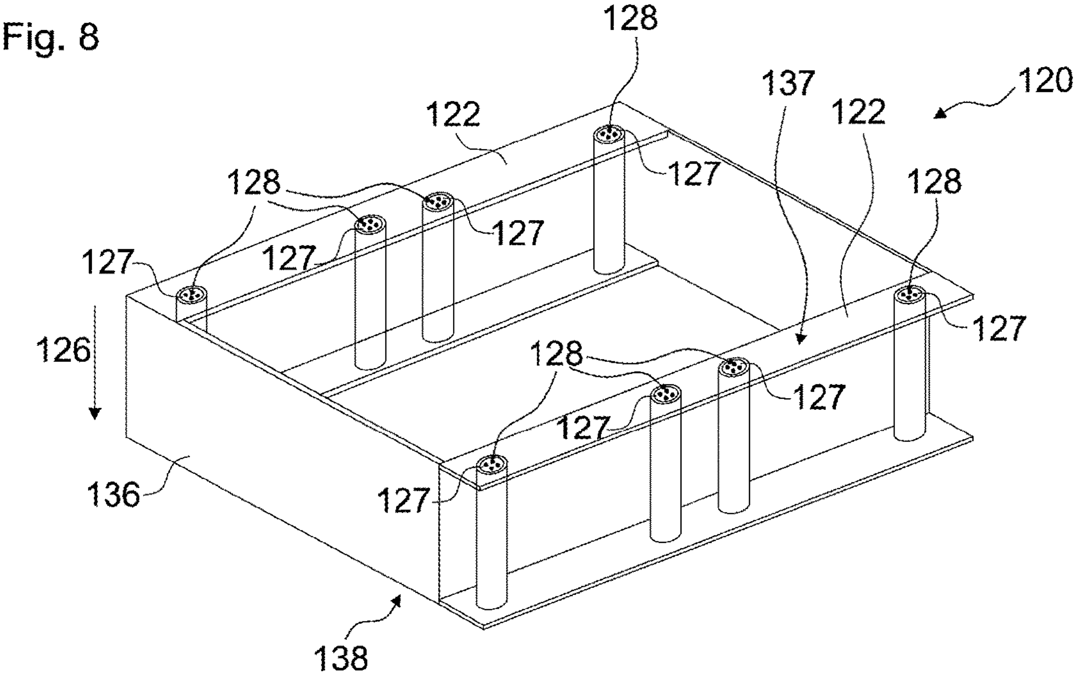
FIGS. 8 and 9 are schematic views of a clamping arrangement according to an embodiment.
Figure 9:
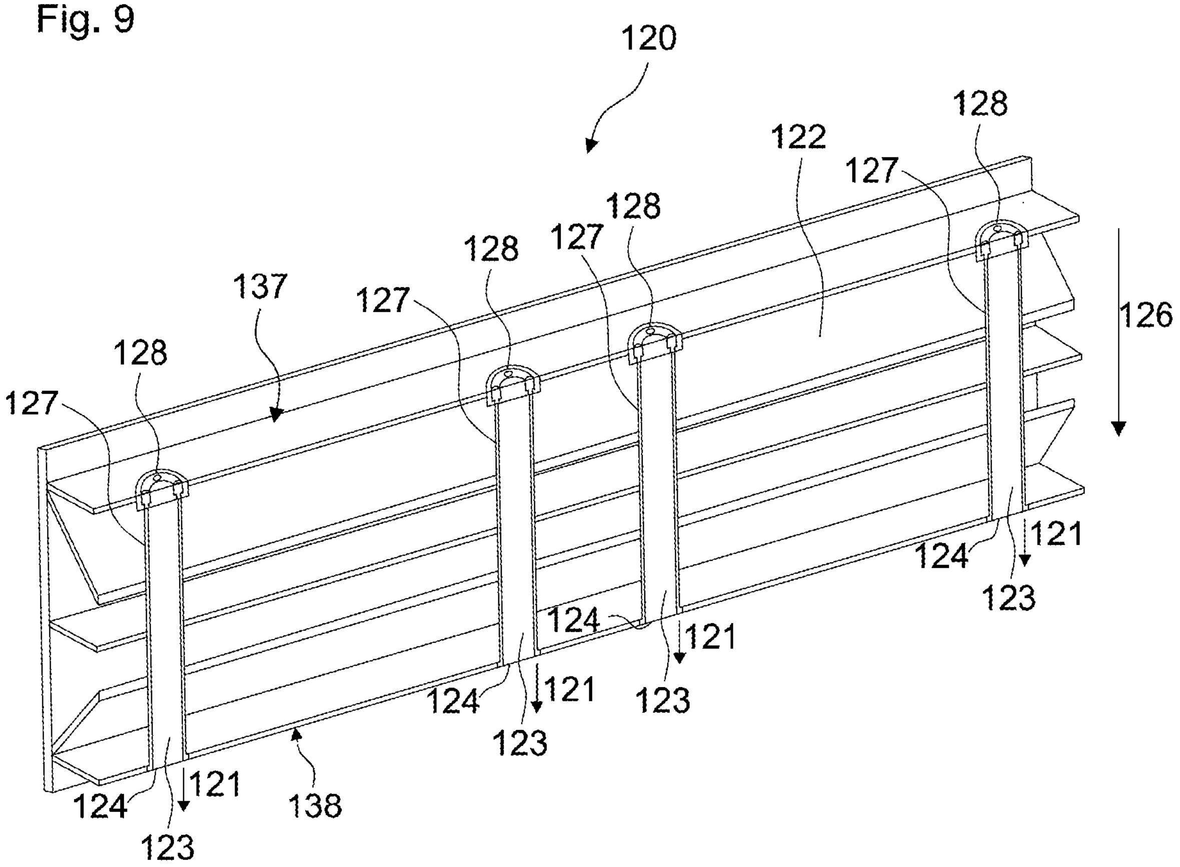

FIGS. 8 and 9 show schematic views of the clamping arrangement 120 according to an embodiment. The beams 122 form a rectangular frame that is configured to surround parts of the coil 102. The plunger sleeves 127 are arranged inside the beams 122 almost completely or completely such that the screw device 128 is accessible from above. The plunger sleeves 127 reach from an upper side 137 of the frame 136 to a lower side 138 of the frame 136. The upper side 137 faces the opening 115 of the tank 110. The lower side 138 of the frame 136 faces the bottom 117 of the tank. The screw device 128 is accessible at the upper side 137. The plunger 123 reaches from the screw device 128 through the frame 136 to the lower side 138. At the lower side 138 the plunger 123 exerts the clamping force 121 to the magnetic core 101. The value of the clamping force 121 is precisely settable by affecting a corresponding torque to the screw 129. The torque affected to the screw 129 is transferred to the plunger 123 and transferred to the magnetic core 101 due to the contact of the plunger 123 at the contact surface 134 with the magnetic core 101. According to an embodiment, for example, torque between 100 newton meter and 300 N·m is affected to an M16 type (metric screw thread) screw 129. Of course, other kinds of screws with different diameters can be used and accordingly different torques will be affected to the screw 129 depending on the desired clamping force 121.

Figure 10:
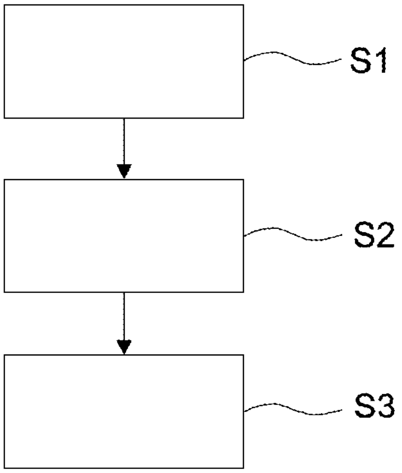
FIG. 10 is a flowchart of a method for clamping a magnetic core according to an embodiment.

FIG. 10 shows a flowchart of a method for clamping the magnetic core 101 according to an embodiment.

In a step S1 the screw 129 is turned for affecting the torque to the plunger 123. The screw is turned depending on a predetermined torque which is determined in dependence on the desired clamping force 121.

In a step S2 the turning of the screw 129 leads to a movement of the plunger 123 dependent on the affected torque.

In a step S3 the movement of the plunger 123 exerts the clamping force 121 on the magnetic core 101. Of course, the turning of the screw 129, the moving of the plunger 123 and the exerting of the clamping force 121 in reality takes place simultaneously.

The clamping arrangement 120 allows an increase of the connection forces in the joints 105 of the magnetic core 101 of the shell type transformer 100. The plunger 123 is embedded in the plunger sleeve 127 and in the beam 122 of the upper tank part 113. The clamping force 121, and thus the connection force, is controlled by the screws 129 located at the first axial end 131 of the plunger sleeve 127. A known torque or tightening force of the screws 129 leads to a known clamping force 121 transferred to the magnetic core 101 and hence to known connection forces. The plunger 123 and the plunger sleeve 129, together with the screw device 128, are assembled to a unit prior to being welded into the beam 122 according to embodiments.

The screw device 128 is accessible from above through the upper opening 150. Thus, the clamping forces 121 can be controlled, not only during the first mounting of the shell type transformer 100, but also later for maintenance. For controlling the clamping force 121 the shell type transformer 100 does not need to be completely disassembled. Meanwhile, the screws 129 at the upper side 137, which are easily accessible through the upper opening 115 or openings in the cover 116, may be reached with a tool. Thus, forces acting on the magnetic core 101, in particular on the joints 105, can be easily, precisely and reliably controlled. The tightened magnetic core 101 better withstands short circuit forces.

The controlled clamping of the magnetic core 101 via the precisely settable clamping force 121 leads to a higher reliability of the transformer 100. The clamping arrangement 120 allows a reclamping of the magnetic core 101 over a lifetime. The clamping arrangement 120 realizes a reliable system for exerting desired and preset clamping forces 121 to the magnetic core 101.

The embodiments shown in the FIGS. 1 to 10 as stated represent exemplary embodiments of the transformer tank 110, the transformer 100 and the method for clamping the magnetic core 101; therefore, they do not constitute a complete list of all embodiments according to the transformer tank 110, the transformer 100 and the method. Actual arrangements transformer tank 110, the transformer 100 and the methods may vary from the embodiments shown in the figures.

REFERENCE SIGNS

100 shell type transformer
101 magnetic core
102 coil
103, 104 magnetic core parts
105 joint
110 transformer tank
111 wall
112 tank interior
113 upper tank part
114 lower tank part
115 upper opening
116 cover
117 bottom
120 clamping arrangement
121 clamping force
122 beam
123 plunger
124 first axial end
125 second axial end
126 longitudinal axis
127 plunger sleeve
128 screw device
129 screw
130 opening
131 first axial end of plunger sleeve
132 second axial end of plunger sleeve
133 protrusion
134 contact surface
135 sleeve interior
136 frame
137 upper side
138 lower side
S1 to S3 method steps

The invention claimed is:

1. A clamping arrangement for exerting a clamping force on a magnetic core of a shell type transformer, the clamping arrangement comprising:
  a beam that is fixable to an interior wall of the transformer;
  a plunger sleeve arranged inside the beam, the plunger sleeve comprising a thread;

a plunger arranged inside the plunger sleeve, the plunger comprising a first end to exert the clamping force on the magnetic core, the plunger being movable with respect to the beam and the plunger sleeve along a longitudinal axis, and a value of the clamping force being adjustable based on a position of the plunger with respect to the beam; and a screw device comprising a screw arranged at a first end of the plunger sleeve in contact with a second end of the plunger to move the plunger along its longitudinal axis, and the screw being turnable in the thread of the plunger sleeve to move with respect to the plunger sleeve along the longitudinal axis and to set a part of the screw that protrudes the sleeve interior.

2. The clamping arrangement according to claim 1, wherein the plunger sleeve comprises an opening at the second end of the plunger sleeve, and wherein the plunger reaches through the opening and protrudes over the plunger sleeve at the second end of the plunger sleeve.

3. The clamping arrangement according to claim 1, wherein the clamping arrangement is arranged in an upper tank part of a transformer tank of the transformer such that the clamping arrangement is accessible from an upper opening of the transformer tank.

4. The clamping arrangement according to claim 1, wherein the clamping arrangement comprises a plurality of plungers configured to exert an adjustable value of the clamping force on the magnetic core.

5. The clamping arrangement according to claim 1, wherein the plunger sleeve comprises a plurality of plunger sleeves arranged inside the beam, wherein the plunger comprises a plurality of plungers, each plunger arranged inside a plunger sleeve of the plurality of plunger sleeves, and wherein the screw device comprises a plurality of screw devices, each screw device arranged at a first end of a plunger sleeve of the plurality of plunger sleeves in contact with a second end of a plunger of the plurality of plungers.

6. The clamping arrangement according to claim 5, wherein the beam comprises a plurality of beams, each beam of the plurality of beams comprising a subset of the plurality of plunger sleeves, the plurality of plungers, and the plurality of screw devices.

7. The clamping arrangement according to claim 5, wherein each plunger of the plurality of plungers is arranged to exert an independently adjustable value of the clamping force on the magnetic core.

8. A shell type transformer, comprising:

a transformer tank;

the magnetic core arranged in the transformer tank; and the clamping arrangement according to claim 1.

9. The shell type transformer according to claim 8, wherein the plunger is movable with respect to the beam to exert the clamping force on the magnetic core such that the clamping force pushes the magnetic core away from the beam.

10. The shell type transformer according to claim 8, wherein the magnetic core comprises two separate magnetic core parts, and wherein a force at a joint between the two magnetic core parts is settable depending on the value of the clamping force.

11. The shell type transformer according to claim 8, wherein the transformer tank comprises an upper opening, and wherein the clamping arrangement is arranged in an upper tank part of the transformer tank such that the clamping arrangement is accessible from the upper opening of the transformer tank.

* * * * *